(12) United States Patent
Rao

(10) Patent No.: US 6,782,417 B1
(45) Date of Patent: *Aug. 24, 2004

(54) ADVERTISING SYSTEM FOR CALLERS TO BUSY DATA SERVICE PROVIDERS

(75) Inventor: Sanjay H. Rao, Apex, NC (US)

(73) Assignee: Nortel Networks Limited, St. Laurent (CA)

(*) Notice: Subject to any disclaimer, the term of this patent is extended or adjusted under 35 U.S.C. 154(b) by 0 days.

This patent is subject to a terminal disclaimer.

(21) Appl. No.: 09/416,540

(22) Filed: Oct. 12, 1999

(51) Int. Cl.⁷ .............................................. G06F 15/16
(52) U.S. Cl. ...................... 709/217; 709/219; 709/203; 379/209.01; 379/210.01
(58) Field of Search ................ 709/217, 202, 709/201, 219, 203; 379/209.01, 210.01

(56) References Cited

U.S. PATENT DOCUMENTS

| 4,549,302 A | | 10/1985 | Heatherington |
| 4,850,007 A | | 7/1989 | Marino et al. |
| 5,311,574 A | * | 5/1994 | Livanos ................ 379/209.01 |
| 5,781,894 A | * | 7/1998 | Petrecca et al. ............. 705/14 |
| 5,802,151 A | | 9/1998 | Belvill, Jr. et al. |
| 5,854,897 A | * | 12/1998 | Radziewicz et al. ........ 709/217 |
| 5,903,642 A | * | 5/1999 | Schwartz et al. ........... 379/309 |
| 5,923,736 A | * | 7/1999 | Shachar ................ 379/110.01 |
| 6,026,151 A | * | 2/2000 | Bauer et al. ............ 379/114.24 |
| 6,049,603 A | * | 4/2000 | Schwartz et al. ........... 379/309 |
| 6,145,002 A | * | 11/2000 | Srinivasan .................. 709/225 |
| 6,199,106 B1 | * | 3/2001 | Shaw et al. ................. 709/203 |
| 6,236,722 B1 | * | 5/2001 | Gilbert et al. .............. 379/230 |
| 6,237,039 B1 | * | 5/2001 | Perlman ..................... 370/229 |
| 6,463,457 B1 | * | 10/2002 | Armentrout et al. ........ 709/201 |

FOREIGN PATENT DOCUMENTS

WO WO 98/56154 12/1998

* cited by examiner

Primary Examiner—Ario Etienne
Assistant Examiner—LaShonda Jacobs
(74) Attorney, Agent, or Firm—Nortel Networks; John R. Witcher, III

(57) ABSTRACT

Advertising system for callers to busy data service providers. A caller to an ISP or similar service for which the number is busy can be automatically connected to a server which provides advertisements or other information while waiting for the number to become free. The connection to the server is dropped automatically when the ISP number is no longer busy, and a connection to the service provider originally dialed is automatically established. Software in a PSTN implements part of the invention, while software in a computer application or modem firmware implements the steps of the invention performed at the CPE. A user of the invention need not keep trying a busy number, and the feature can be paid for by revenue from selling the advertising.

16 Claims, 5 Drawing Sheets

ADVERTISING SYSTEM FOR CALLERS TO BUSY DATA SERVICE PROVIDERS

CROSS-REFERENCE TO RELATED APPLICATION

2. This application is related to, commonly assigned application number 09/410,231, filed Sep. 30, 1999, now U.S. Pat. No. 6,614,896, which is incorporated herein by reference.

BACKGROUND

1. Field of the Invention

This invention is related to the use of advertising to pay for telecommunication services. In particular, this invention is related to the use of advertising to pay for an automatic callback feature for busy on-line service connections in the public switched telephone network.

2. Description of the Problem

Telecommunication today on the Public Switched Telephone Network (PSTN), is marked by the proliferation of numerous services to provide convenience to users. Among these services is automatic callback (ACB), through which a caller to a busy directory number (DN) can have the number monitored. When the DN becomes free, the originator of the call is automatically called back by the PSTN. When the originator picks up the callback, the DN which was called is rung. In this scenario, a PSTN switch between the originator and the telephone associated with the DN offers to keep trying the busy number for an additional cost.

ACB is defined for POTS (plain old telephone system) in Telcordia (formerly BELCORE) standard TR-NWT-000215, Issue 3, June 1993. ISDN (integrated services digital network) ACB (I-ACB) is defined in Telcordia standard TR-NWT-000855, Issue 3, June 1993. Both of these standards are widely distributed and available from many technical libraries, or can be ordered from Telcordia Technologies, Inc. The ACB facility monitors the line state of the telephone line associated with the called DN to determine if the line is busy or idle. When the called party becomes idle, the caller is notified and a call is established between the two agents.

Users of the PSTN to call on-line services or to make Internet connections also encounter busy signals. FIG. 1 illustrates what happens when computer 110 initiates a call through modem 112 and switch 114 to Internet service provider (ISP) 116, connected to the switch in this case through an integrated services digital network (ISDN) primary rate interface (PRI). A call attempt is made at 101 and a busy signal is received at 102. This busy signal can be returned for two different reasons. One possibility is there are no free bearer channels available for completing the call on the ISDN PRI thus making the entire interface as busy. In this case signaling of the busy condition depends on the type of originating agent. For example, if the originating agent was a POTS line, a busy signal is played and detected by the modem, which then sends an appropriate message to an application running in the computer. Another possibility is that the called ISP on the other end of the PRI is busy. In this latter scenario, the remote end sends an appropriate PRI disconnect message, which would again produce a busy signal if the originating agent is a POTS line. In either case, the computer user is left to automatically or manually retry dialing the ISP and wait.

While the previously described ACB works very well for traditional voice connections, it does not work for data connections. Neither the data connection equipment at the service provider end nor personal computer modems are equipped to provide the handshaking needed to ask for or receive connection attempts on a telephone line that is monitored. Additionally, many users of the PSTN for on-line connections would not want to pay the fee associated with the use of the feature. What is needed is a way to provide an automatic call-back feature for busy data connections. Ideally, there should be a mechanism to pay for the feature without placing the burden on the end user.

SUMMARY

The present invention meets the above needs by providing a system in which a caller to a busy data service provider or ISP can automatically view advertising or other messages on his or her personal computer while waiting for the busy number to become free. When the called number is no longer busy, a connection to the data service provider is automatically negotiated and the user continues with a normal online session. Advertising offered to the user can be used to pay for the service and generate additional revenue for the telephone company.

The invention is implemented by a combination of special software in a switch which is disposed in the PSTN between the user and the on-line service provider, and software and/or hardware at the user's workstation or personal computer. At the personal computer, which is equipped with a modem, a call is placed to the on-line service provider directory number (DN) and an indication is received that the number called is busy, for whatever reason. A connection is then negotiated with an advertisements server on the PSTN. The service provider DN is monitored. When the DN is no longer busy, the connection to the advertisements server is automatically dropped and the user is connected to the on-line service provider. In a preferred embodiment, the user is given a choice as to whether to view advertising while waiting for the DN to become free. The user's customer premises equipment (CPE) then sends an access code to indicate in the affirmative. In one preferred embodiment the access code is sent and the connecting and disconnecting is managed by firmware in a modem specifically designed to implement the invention. In another preferred embodiment an application in a personal computer performs these tasks and controls the modem through the use of standard modem commands.

A switch which implements the invention first receives a call from the originating CPE for a busy number associated with an interface for an on-line service provider. The switch then notifies the CPE of the busy status and determines of the user wishes to view advertising while waiting for the interface to become available. If so, the call is forwarded to an advertisements server while the interface is monitored. When the interface is no longer busy the call is forwarded to the service provider. In the preferred embodiment the determination as to whether the user wishes to view advertising is made by waiting for the access code for the service; however, it is possible that a user could have his or her telephone line provisioned to automatically use the service whenever a busy ISP number is encountered, in which case the determination would be made by checking the provisioning data.

The software which implements many aspects of the present invention can be stored on a media. The media can be magnetic such as diskette, tape or fixed disk, or optical such as a CD-ROM. Additionally, the software can be supplied via the Internet or some type of private data network. A workstation which typically runs the Internet or other on-line service application software includes a plurality of input/output devices a connection for a modem and a system unit which includes both hardware and software necessary to implement the invention. The modem includes a microprocessor with associated memory containing the microcode to operate the modem, a data pump, a host computer interface, a hookswitch, and a data access arrangement (DAA) circuit. A telecommunication switch which implements the invention includes a switching matrix, one or more peripheral modules connected to the switching matrix, one or more input/output devices connected to the switching matrix, and a processor core which controls the operation of the switch and, during operation, contains the computer program code which implements the invention. The CPE, switch, and the ISP interface are all interconnected by a PSTN which includes the advertisements server.

DETAILED DESCRIPTION

Figure 1:
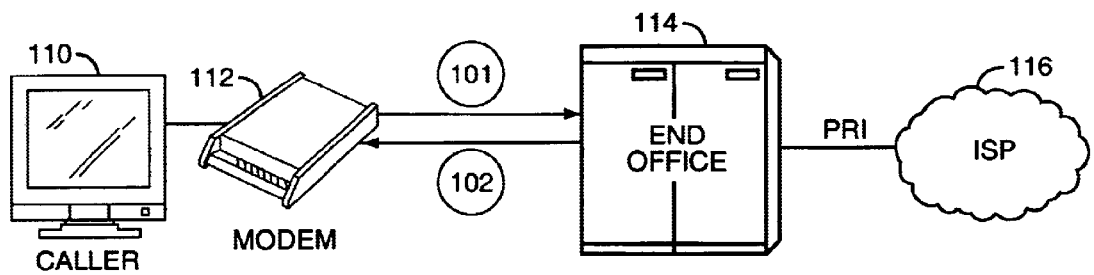
FIG. 1 illustrates the network and the connection method of the prior art.
Figure 2:
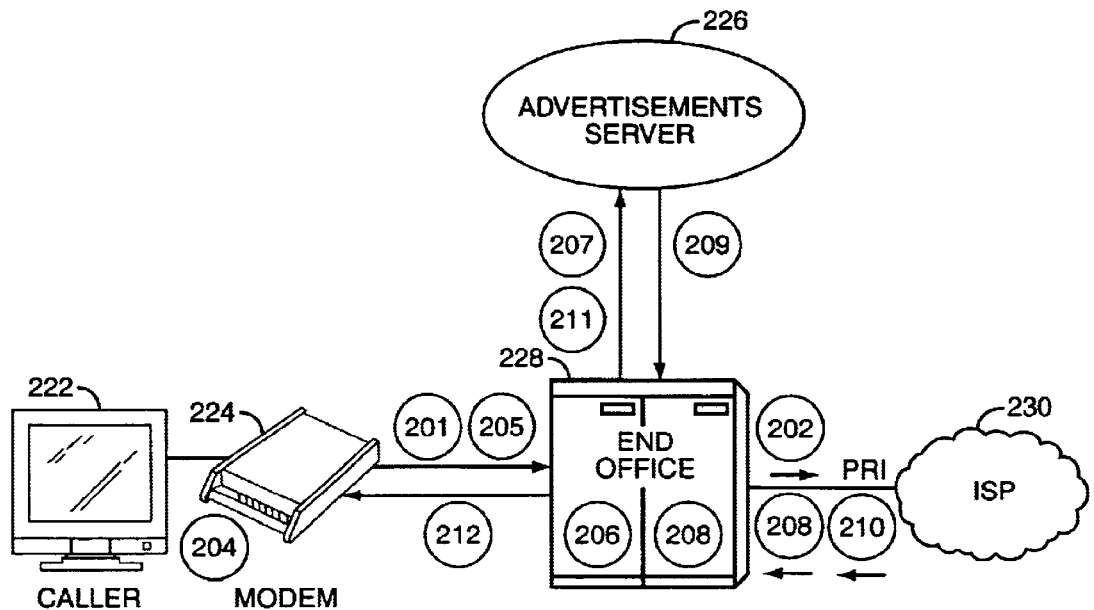
FIG. 2 illustrates the network in which the invention is implemented, and also illustrates the various steps performed by the CPE and the switch which implement the invention.

FIG. 2 shows a high-level block diagram of the network in which the invention is implemented. FIG. 2 also shows the steps performed to carry out the invention. The network of FIG. 2 includes customer premises equipment (CPE) including a modem 224 and a personal computer or workstation 222 connected to an end-office switch 228. The switch is also connected to advertisements server 226 and an internet service provider (ISP), 230. It should be noted that there may be many switches in the connection path between the caller and the ISP 230, however, only the switch which implements the invention is shown for the sake of simplicity. At 201 the calling party CPE dials the directory number (DN) through a modem. End-office switch 228 tries to establish a connection with ISP 230 at 202. A determination is made at 203 that the DN associated with the ISP is busy. The calling party modem detects a busy signal at 204. In the preferred embodiment, at this point, software either embedded in the modem firmware, or in an application on the personal computer determines that the connection is busy and also determines whether or not the user would like to view advertisements, news, or other information while waiting for the connection to become free. If the user agrees, an access code is sent to the switch at 205. At 206 the switch recognizes the access code and activates the feature.

Once the feature is activated, the call is forwarded to the advertisements server at 207 in FIG. 2. At 208 the ISP DN is monitored over the interface between the ISP and the switch, usually an integrated services digital network (ISDN) primary rate interface (PRI). This monitoring is provided by the previously discussed feature called ISDN automatic callback (I-ACB). While the busy interface is being monitored, advertisements other information items are transmitted to the user at 209 through the user's modem 224. This connection includes a modem-to-modem data connection between the user's modem 224 and a modem which is installed at the switch.

At 210 the switch determines that the ISP DN is idle. At 211 the advertisements server is signaled to release the call. At 212 the user is informed that the called party is idle and a connection is set up between the user and ISP 230. At this point, the user proceeds with a normal on-line data session with his or her service provider.

The advertisements server which is used with the present invention will typically be implemented on a workstation or computer having sufficient storage media to store all of the various messages. The advertisements server can be interfaced with the switch in many ways. If the switch is an ISDN switch, the interface will probably be a PRI trunk. In this case, the sigalling used will follow the well-known International Telecommunications Union (ITU) Q.931 standard. The interface can also be an ISDN user part (ISUP) trunk which implements messaging via a signaling system 7 (SS7) network. In a telephony network using voice-over-internet protocol architecture, the advertisements server may be connected through a gateway using ITU H.323 signaling, or a similar voice-over-IP type of signaling. In order to communicate with the modem, 224 at the CPE, a modem is also disposed at the switch, 228. The second modem converts the data from the advertisements server 226 into traditional modem signals. Often this modem will be part of a modem pool, so that many users of this feature can be connected at the same time.

Figure 3:
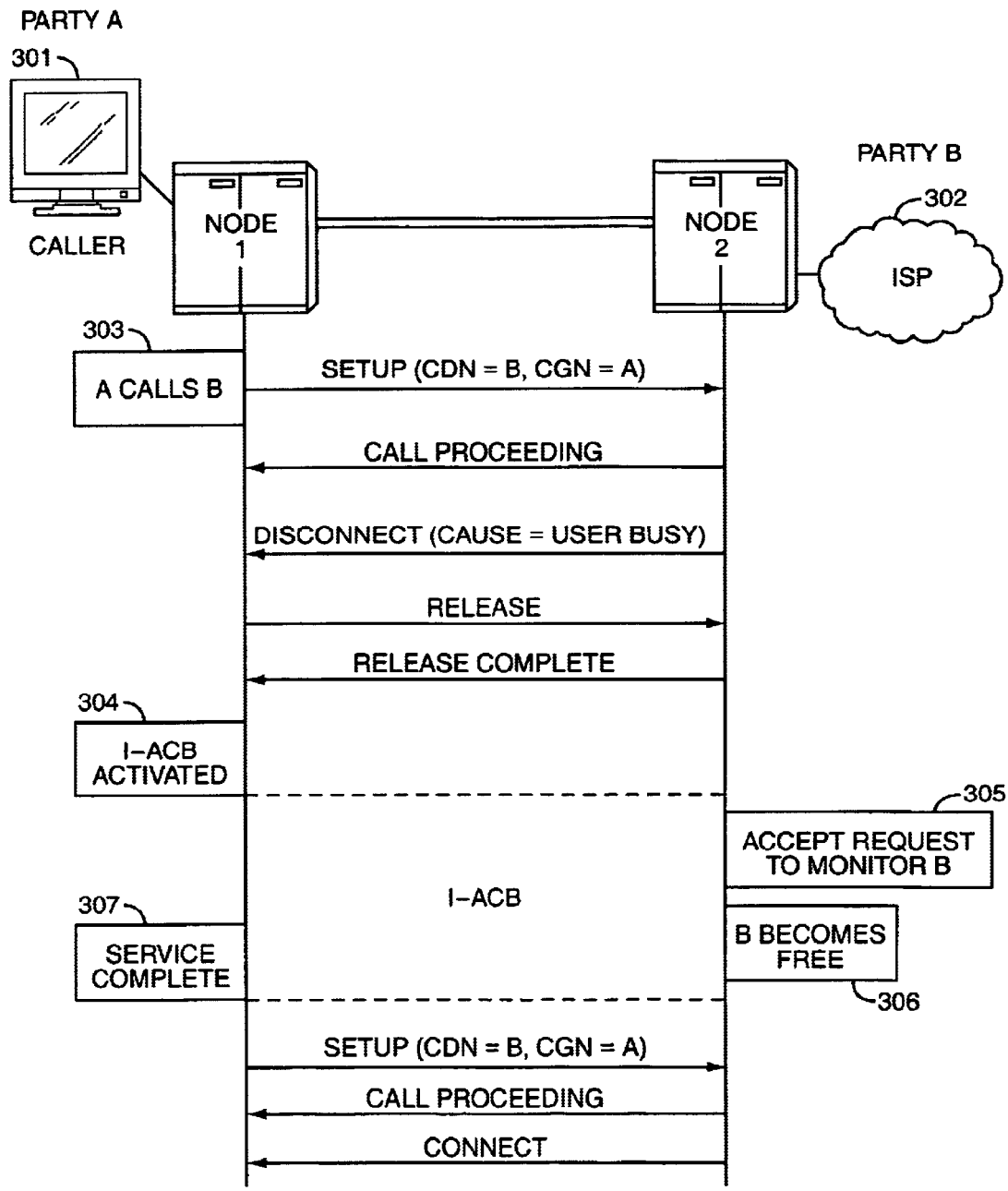
FIG. 3 illustrates the details of the messaging performed on the network to implement the invention.

FIG. 3 illustrates how the busy number monitoring is handled using the I-ACB feature as defined in Telcordia standard TR-NVT-000855, Issue 3, June 1993. The messaging in FIG. 3 is ITU Q.931 standard, and is typical of how the I-ACB is implemented except that party A, 301, is a CPE computer and party B, 302 is an ISP. At 303 A calls B. A is associated with a CallinG Number (CGN) and B is associated with a CalleD Number (CDN). The call is released due to a busy signal and I-ACB is activated at 304. The node associated with party B (the ISP) accepts the request to monitor at 305 and B becomes free at 306. At 307 the I-ACB service is complete, and the CPE is connected with the ISP to proceed with a normal on-line session.

A determination as to whether the user wishes to make use of the advertising service can be made on a per call basis. In this case, an access code is entered by the CPE, after the user indicates his or her wishes to use the service by appropriate key strokes entered in on his or her computer. It is also possible to have the line provisioned so that the feature is invoked automatically. In this case, the determination as to whether the user wishes to view advertising is made by examination of the appropriate provisioning information and communicating that information to the switch which is implementing the invention.

Figure 4:
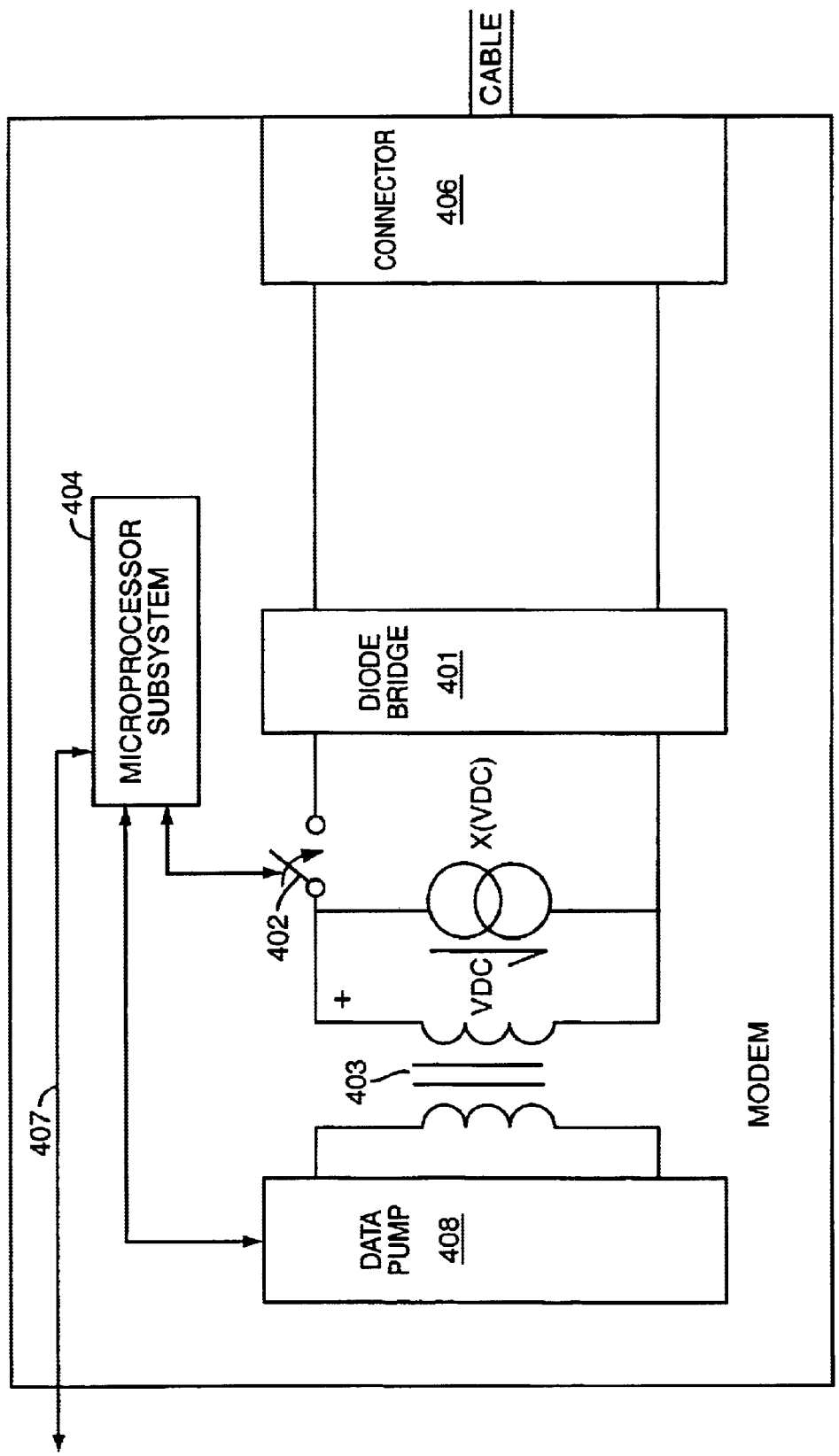
FIG. 4 is a block diagram of a modem which implements the CPE steps in one embodiment of the invention.

In either of the above cases the CPE must negotiate the connection and disconnection of the advertisements server and the ISP, and send the access code if required. As previously mentioned, software to perform these tasks can be imbedded in the modem, installed at the personal computer, or a combination. FIG. 4 illustrates the case where the software is included in a modem. FIG. 4 is a block diagram of a modem which includes software to implement the present invention. In FIG. 4, the microprocessor subsystem 404 provides modem function and also includes computer memory containing microcode for all of the modem's operations, including those which are related to the present invention. The modem is connected to the network through a cable attached to connector 406. Hook switch 402 and transformer 403 are connected the telephone network through a diode bridge 401. The microprocessor controls the data pump, 408, and sends and receives data to the host computer through the host computer interface, 407. If a digital signal processor (DSP) is used as the main microprocessor for this embodiment, the data pump function is performed by the DSP and the data pump, 408, and microprocessor 404 are in effect integrated together on the same chip. The microprocessor or DSP can send messages to the CPE personal computer through the host computer interface, 407, and the host computer can, in turn, display the message to the user on the display screen, and receive input from the user via the keyboard. Note that host computer interface 407 can be either a connector which interfaces to a cable and connects to the computer (an external modem), or a bus connector which plugs into a personal computer system bus (internal modem). Additional information on the workings of computer modems is readily available. For further information, see U.S. Pat. No. 4,549,302 to Heatherington, issued Oct. 22, 1985, or U.S. Pat. No. 5,802,151 to Bevill, Jr. et al., issued Sep. 1, 1998. These patents are incorporated herein by reference.

It is also possible to implement the CPE side of the invention purely with software installed on the personal computer. This software can be specially marketed just to implement the advertising service, or it could be integrated in with an internet application such as a web browser. In either case, the PC would provide the function by controlling a standard modem using standard modem commands, for example the well-known "AT" command set which is commonly used to control the operation of a computer modem. In this case the modem is put into a command mode using a special character string and the letters "AT". Commands which follow the "AT" have specific meanings and can be used to set registers inside the modem which control its operation. For example using the standard AT command to set register S10 sets the duration that a modem waits to hang up after loss of a carrier. This command can be used to order the modem to wait for a new carrier when the connection is broken with the advertisements server and needs to be reestablished with the service provider. Other commands control whether the modem is in answer mode, or initiating a connection. For further information on controlling a modem in command mode, see the Heatherington patent cited above. Numerous books and technical references on modem command and control are also widely available.

Figure 5:
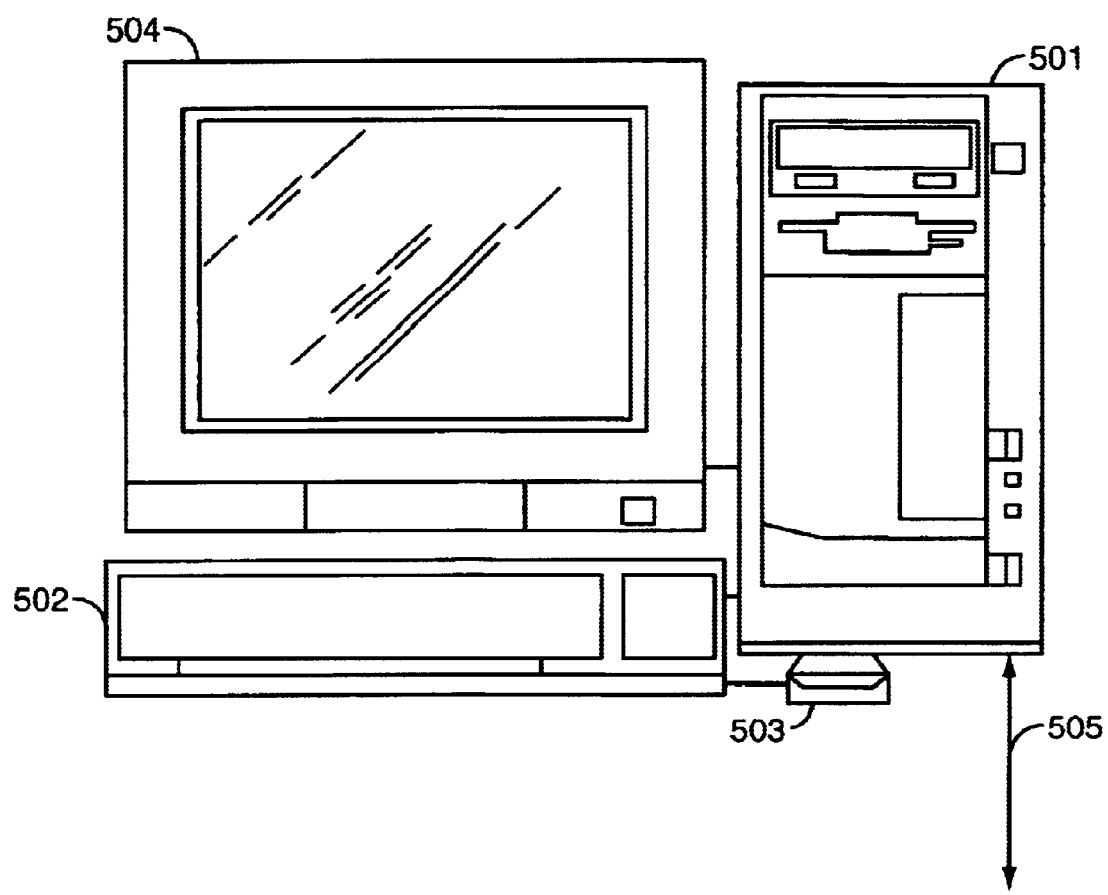
FIG. 5 is a block diagram of a switch which implements the present invention.

FIG. 5 illustrates a personal computer (PC) workstation on which the CPE software of the present invention can be operated. The PC includes input/output (I/O) devices such as keyboard 502, mouse 503, and display 504. The display is used to show an operator a computer desktop on which various information is displayed. Such information may include information about the busy status of an ISP. System unit 501 is connected to all of the I/O devices, and contains memory, media devices, and a central processing unit (CPU) all of which together execute the software of the present invention. A PSTN interface is implemented via an adapter card and for the sake of simplicity is shown graphically as interface 505. An alternative embodiment would show an external modem connected to the personal computer and in turn connected to the PSTN.

Figure 6:
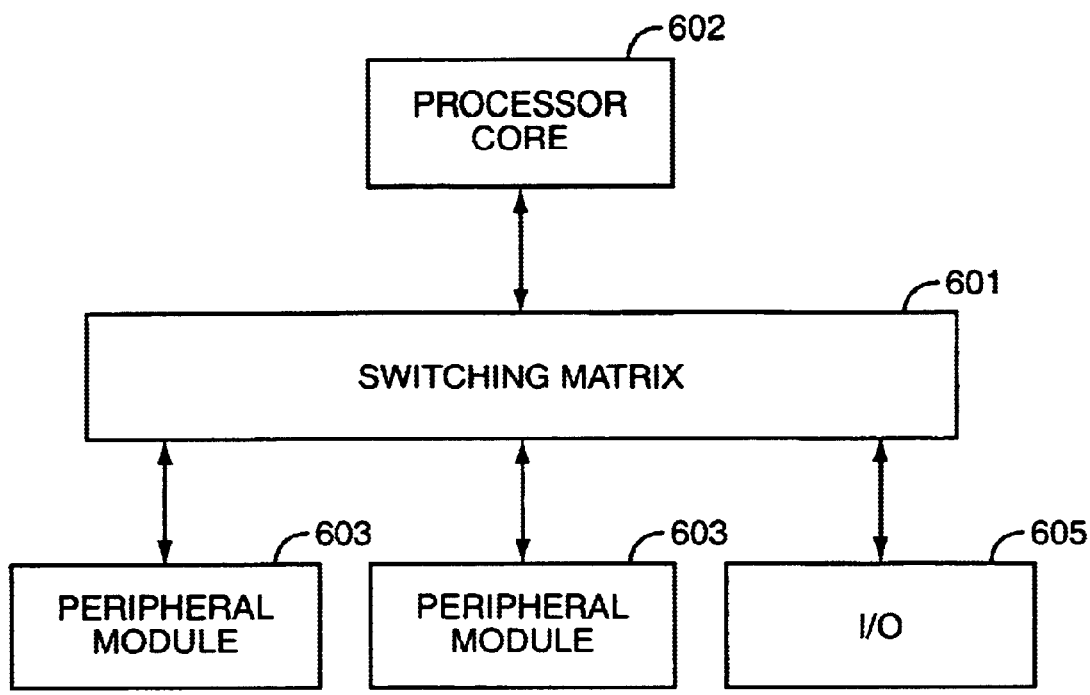
FIG. 6 illustrates a media on which computer program code which implements the present invention can be stored.

FIG. 6 illustrates a conceptual, functional block diagram of a switch which implements parts of the invention. Processor core 602 includes a central processing unit, memory, and supporting circuitry. In some switch architectures, the processor core is called the computing module. This processor core, together with any computer program code stored in memory, is the means for controlling the overall operation of the switch. Switching matrix 601 allows the processor core to communicate with the other components. The switching matrix includes one or more buses and accompanying internal circuitry. Input/output (I/O) module 605 is also connected to the switching matrix and includes removable media devices to load computer program code. The I/O module also includes devices for connection to workstations and similar equipment. The peripheral modules, 603, are connected to the switching matrix, 601, and are managed by the processor core, 602. The peripheral modules, 603, provide an interface to various networks including various types of line interfaces, as well as interfaces to CPE. It should be noted that the computer program code which implements the invention can be stored and executed within the switch itself, or in another device. For example, some of the computer program code could be stored and executed by the advertisements server or by an auxiliary device connected to the switch via an auxiliary network such as an advanced intelligent network.

Figure 7:
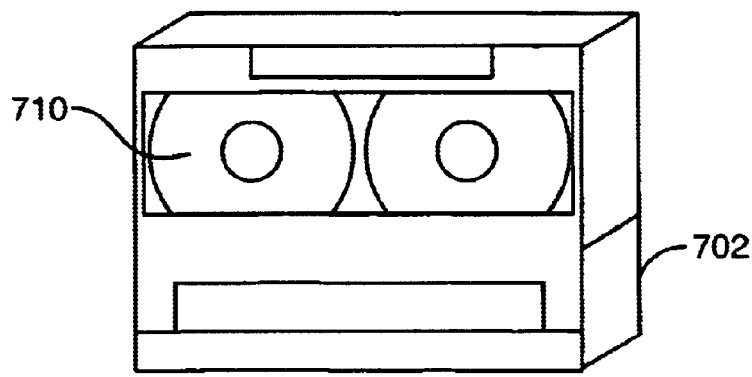
FIG. 7 illustrates a personal computer which implements the CPE steps in another embodiment of the invention.

Appropriate computer code in combination with hardware implements many of the elements of the present invention. The computer program code is often stored on a storage media. This media can be a diskette, hard disk, CD-ROM, or tape. The media can also be a memory storage device or a collection of memory storage devices such as read-only memory (ROM) or random access memory (RAM). Additionally, the computer code can be transferred to the switch or the PC over some type of data network. FIG. 7 illustrates one example of a media. FIG. 7 shows a tape cartridge of the type where magnetic media 701 is enclosed in a protective cassette, 702. Magnetic field changes over the surface of the magnetic media, 701, are used to encode the computer program code. In this way the computer program code is stored for transport and later retrieval. should be noted that because computer program code is used to implement the invention, there is an infinite variety of ways to handle specific details of the invention. There are also numerous types of switching systems in use, any one of which could be adapted and programmed to implement the invention. Although I have described specific embodiments of the invention, the description is not intended to limit the applicability of the following claims.

I claim:

1. A method of displaying advertising at originating customer premises equipment (CPE), said advertising originating from a source distinct from the originating CPE and a data service provider, the method comprising the steps of:

receiving a data call from the originating CPE, the data call destined for the data service provider, the data service provider connected to a public switched telephone network (PSTN) interface which is busy;

notifying the originating CPE of the busy status of the interface and determining if a user of the originating CPE wishes to view advertising;

if the user wishes to view advertising, forwarding the call to an advertisements server associated with the distinct source while monitoring the PSTN interface; and forwarding the call to the data service provider when the interface is no longer busy.

2. In a computer system, a method of receiving advertising while waiting for a connection to a data service provider, said advertising originating from a source distinct from the data service provider, the method comprising the steps of:

initiating a call to the data service provider and receiving an indication that a directory number (DN) associated with the data service provider is busy;

negotiating a connection with an advertisements server associated with the distinct source; and automatically dropping the connection to the advertisements server and negotiating a connection to the data service provider when the data service provider DN is no longer busy.

3. The method of claim 2 further comprising the step of sending an access code when the busy indication is received, the access code being an indication that a current user of the computer system will view advertising while waiting for the data service provider to become available.

4. The method of claim 3 wherein the access code is sent by firmware in a modem which is interconnected with the computer system.

5. The method of claim 3 wherein the access code is sent by an application running in the computer system.

6. Apparatus for displaying advertising at originating customer premises equipment (CPE), said advertising originating from a source distinct from the originating CPE and a data service provider, the apparatus comprising:

means for receiving a data call from the originating CPE, the data call destined for the data service provider, the data service provider connected to a public switched telephone network (PSTN) interface which is busy;

means for forwarding the call to an advertisements server associated with the distinct source while monitoring the PSTN interface; and means for forwarding the call to the data service provider when the interface is no longer busy.

7. A computer system programmed for receiving advertising while waiting for a connection to a data service provider, said advertising originating from a source distinct from the data service provider, the computer system comprising:

means for initiating a call to the data service provider and receiving an indication that a directory number (DN) associated with the data service provider is busy;

means for negotiating a connection with an advertisements server associated with the distinct source; and means for automatically dropping the connection to the advertisements server and negotiating a connection to the data service provider when the data service provider DN is no longer busy.

8. The computer system of claim 7 further comprising means for sending an access code when the busy indication is received, the access code being an indication that a current user of the computer system will view advertising while waiting for the data service provider to become available.

9. The computer system of claim 8 wherein the access code is sent by firmware in a modem which is interconnected with the computer system.

10. The computer system of claim 8 wherein the access code is sent by an application running in the computer system.

11. A programmed telecommunication switch operable to display advertising at originating customer premises equipment (CPE), said advertising originating from a source distinct from the originating CPE and a data service provider, the switch including a processing core which further includes a computer program comprising:

computer program code for receiving a data call from the originating CPE, the data call destined for the data service provider, the data service provider connected to a public switched telephone network (PSTN) interface which is busy;

computer program code for forwarding the call to an advertisements server associated with the distinct source while monitoring the PSTN interface; and computer program code for forwarding the call to the data service provider when the interface is no longer busy.

12. A computer program product for receiving advertising while waiting for a connection to a data service provider, said advertising originating from a source distinct from the data service provider, the computer program product including a medium having a computer program embodied thereon, the computer program comprising:

computer program code for initiating a call to the data service provider and receiving an indication that a directory number (DN) associated with the data service provider is busy;

computer program code for negotiating a connection with an advertisements server associated with the distinct source; and computer program code for automatically dropping the connection to the advertisements server and negotiating a connection to the data service provider when the data service provider DN is no longer busy.

13. The computer program product of claim 12 wherein the computer program further comprises computer program code for sending an access code when the busy indication is received, the access code being an indication that a current user of tie computer system will view advertising while waiting for the data service provider to become available.

14. A computer modem programmed for receiving advertising while waiting for a connection to a data service provider, said advertising originating from a source distinct from the data service provider, the computer modem comprising:

means for initiating a call to the data service provider and receiving an indication that a directory number (DN) associated with the data service provider is busy;

means for negotiating a connection with an advertisements server associated with the distinct source; and means for automatically dropping the connection to the advertisements server and negotiating a connection to the data service provider when the data service provider DN is no longer busy.

15. The computer modem of claim 14 further comprising means for sending an access code when the busy indication is received, the access code being an indication that a current user of the computer system will view advertising while waiting for the data service provider to become available.

16. A network in which advertising is presented at an originator customer premises equipment (CPE) computer system making a call to a busy data service provider directory number (DN), said advertising originating from a source distinct from the originator CPE computer system and the data service provider, the network comprising:

the originator CPE computer system including computer program code for initiating a call to the data service provider and receiving an indication that the directory number (DN) associated with the data service provider is busy, negotiating a connection with an advertisements server associated with the distinct source, and automatically dropping the connection to the advertisements server and negotiating a connection to the data service provider when the data service provider DN is no longer busy;

a connection to a data service provider;

one or more switches disposed between the originator CPE computer system and the data service provider connection, at least one of the one or more switches including computer program code for forwarding the call to an advertisements server and monitoring the data service provider DN; and an advertisements server associated with the distinct source and connected to the one or more switches.

* * * * *